UNITED STATES PATENT OFFICE.

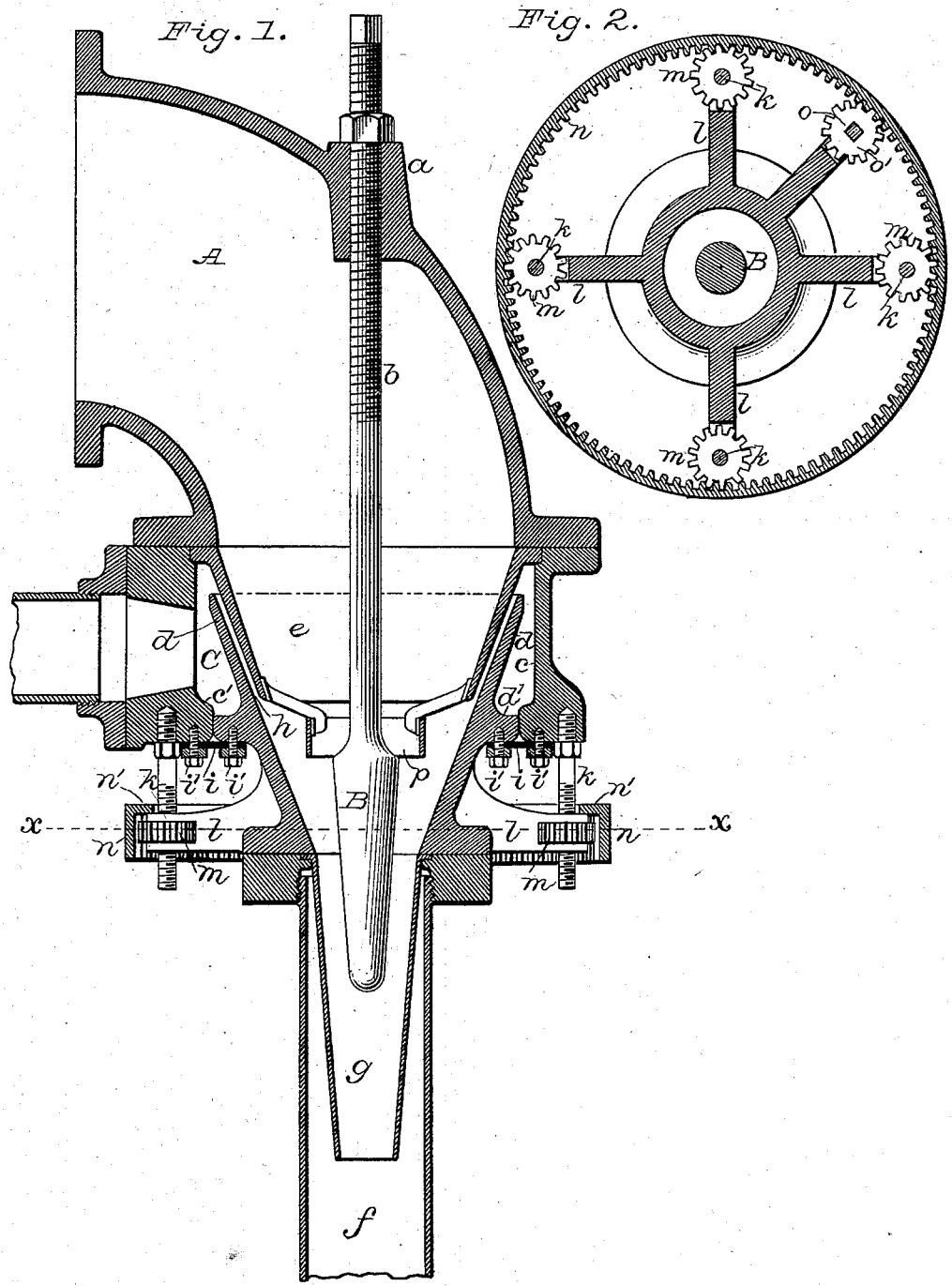

JEROME WHEELOCK, OF WORCESTER, MASSACHUSETTS.

INJECTOR-CONDENSER.

SPECIFICATION forming part of Letters Patent No. 269,979, dated January 2, 1883.

Application filed September 6, 1882. (No model.)

*To all whom it may concern:*

Be it known that I, JEROME WHEELOCK, of the city and county of Worcester, in the State of Massachusetts, have invented certain new and useful Improvements in Injector-Condensers; and I do hereby declare that the following specification, taken in connection with the drawings furnished and forming a part thereof, is a clear, true, and complete description of the several features of my invention.

My said improvements relate to that class of injector-condensers which are illustrated in certain Letters Patent heretofore issued to me, and they involve certain novel features of construction and arrangement of certain portions of the condenser with a view to its more accurate and ready adjustment, that it may more fully fulfill the varied requirements incident to its service.

After a detailed description of the condenser shown in the drawings, the features deemed novel will be specified in the several claims hereunto annexed.

Figure 1 is a central vertical section of my improved condenser. Fig. 2 is a horizontal section of the same on line $x$, Fig. 1.

The exhaust-pipe A is as heretofore shown in my prior Letters Patent, except that it is now provided with a tapped boss, $a$, for the reception of the threaded stem $b$ of the solid nozzle-plug B, so that the latter may be variably adjusted as to height, for purposes hereinafter indicated.

The annular water-chamber C is novel in its construction, in that its outer wall, $c$, and inner wall, $d$, are in two parts; but the steam-nozzle $e$ is as heretofore.

The discharge-pipe $f$ and the tapered discharge-nozzle $g$ are also as heretofore when separately considered; but without changing their function or operation they are now connected with a readily-movable portion of the condenser, instead of being connected to a rigid portion thereof, as heretofore.

The inner wall, $d$, of the water-chamber is internally conical in form, so that its upper end receives the steam-nozzle or mouth-piece $e$, and thereby affords between them the annular water-passage $h$, so that water enters downwardly from the water-chamber in a hollow conical jet; and it is to regulate this jet that I have constructed said inner wall, $d$, separately, so that by raising or lowering it said annular passage can be narrowed or widened. The said inner wall of the water-chamber constitutes also the conical shell, to which, at its lower end, the ejector-nozzle pipe $f$ and its tapered discharge-nozzle $g$ are connected, as shown. The outer wall, $c$, of the water-chamber has at its lower edge an internal flange, $c'$, and coincident therewith on the conical inner wall of the water-chamber is an external flange, $d'$, and the two walls $c$ and $d$ are flexibly connected by means of the annular flexible plate or flat ring $i$, composed of vulcanized rubber or other suitable material, securely applied by bolts $i'$, as shown. The object of this flexible connection is to provide for the vertical movement of said inner wall, and at the same time secure the air and water tight joint requisite, in view of the partial vacuum which is induced within the condenser.

A telescoped connection could of course be used in lieu of the flexible ring with approximately-desirable results, and I do not exclude myself therefrom, although I prefer the flexible ring. As here shown, the flexible ring does not perform any supporting function with respect of the conical inner wall of the water-chamber, said support being afforded by a series of vertical rods or bolts, $k$, tapped into holes in the lower edge of the outer wall, $c$, of the water-chamber. The inner wall, $d$, has a series of radial arms, $l$, one for each bolt or rod $k$, and these latter loosely occupy holes in said arms fitted to receive them. Each arm $l$ is slotted laterally from its outer end for the reception of a gear-nut, $m$, to which a bolt, $k$, is tapped, so that when in position the said gear-nuts support the inner wall of the water-chamber and the discharge-pipe depending therefrom. As a means of adjustment of the annular water-jet aperture or passage $h$, these nuts may be each turned by hand, and involve certain features of my invention; but in order that said gear-nuts may be simultaneously rotated I surround them with an internal gear, $n$, which is supported by its top flange, $n'$, upon the upper surfaces of the arms $l$, at their outer ends; and I provide a rod, $o$ and pinion $o'$, so that on turning said rod the ring-gear will be rotated and the desired adjustment obtained.

The rod $o$, provided at its opposite end with a hand-wheel, may be located at some conveniently-accessible place near the engine.

It will be seen that I employ a single annular partition, $p$, at the foot of the steam-nozzle $c$, as heretofore patented by me; but additional partitions may be used, as shown and described in my prior Letters Patent No. 242,088, May 24, 1881, for more thoroughly breaking up the descending column of steam into numerous annular jets, and thereby rendered all the more favorable for condensing operations.

It will also be seen that the solid nozzle-plug B occupies, with its large base, the center of the annular partition $p$, so that the central portion of the column of steam, instead of descending solidly and unbroken, as heretofore, is radially deflected in a flaring annular or conical jet against the coincident inner wall of the cone, just below the annular water-aperture $h$, thus securing a better commingling of water with all of the steam than has, so far as my knowledge extends, been heretofore obtained in this general class of condensers. It will also be seen that the lower or smaller end of the nozzle-plug B extends downward and into the depending tapered nozzle $g$, within the discharge-pipe $f$, thus providing for an annular discharge-aperture peculiarly favorable to the most perfect results. Said nozzle-plug, at its upper end, therefore operates solely to outwardly deflect the central column of steam, and at its lower portion it serves to consolidate the commingled volumes of steam and water.

It is obviously not essential that the gear-nuts $m$ should occupy slots in the arms $l$, because it is only necessary that said nuts should support the lower movable portion of the condenser. By having the said lower portion of light weight, as well as the annular gear and its operating-rod, this entire movable portion of the condenser might well be so arranged as to generally operate automatically, so that when a certain degree of vacuum had been induced within the condenser external atmospheric pressure would be involved, and, causing the inner wall of the water-chamber to be lifted, would thereby automatically graduate the aperture $h$, so as to always cause the delivery of the exact quantity of water required from time to time.

I am well aware that the water-chamber can be provided with an inner wall which would not project downward, and have connected therewith the discharge-nozzle and the depending pipes, as shown, and also that these latter, being connected firmly to said outer chamber, would not rise and fall with said inner wall, which can obviously in such case be raised and lowered by inclosed mechanism—as, for instance, a horizontal annular cam supporting said inner wall and provided with beveled teeth, and rotated by means of a bevel-pinion and a shaft projecting laterally from the base of the water-chamber through a stuffing-box, and provided with a hand-wheel. I therefore desire it to be distinctly understood that one portion of my invention involves said movable inner wall of the water-chamber regardless of the mechanism by which it is moved, or whether the discharge-pipe be connected directly therewith or otherwise.

I am aware that in pump-condensers a straight steam-nozzle has been employed within a flexible cone, and that said steam-nozzle has been longitudinally adjustable with reference to the small end of said flexible cone, so that the latter could properly operate as a valve and close the water-passage during certain movements of the pump-piston; but it is obvious that such an organization could not be employed in an injector-condenser.

I am also well aware that devices somewhat similar to my tapered plug have heretofore been employed in condensers as adjustable valves or "separators" for controlling the water-supply by being so placed with reference to the water-passages as to increase or decrease the induction of water, according to whether they were lowered or raised; but it will be seen that my tapered plug in no manner controls the water-passage or affects the supply of water to the condenser.

Having thus described my invention, I claim as new and desire to secure by Letters Patent—

1. In an injector-condenser, the combination, substantially as hereinbefore described, of the exhaust-pipe, the conical steam-nozzle, the discharge-nozzle, and an annular water-passage having one wall which is adjustable with reference to the other.

2. In an injector-condenser, the combination of a conical steam-nozzle, a water-chamber containing the steam-nozzle and having a fixed outer wall and a movable conical inner wall surrounding the steam-nozzle, substantially as described, whereby the annular space between said inner wall and the conical steam-nozzle may be graduated for the passage of water.

3. In an injector-condenser, a water-chamber having an outer and an inner wall separately constructed and united by a flexible ring, substantially as described.

4. In an injector-condenser, the combination of the central steam-nozzle, the surrounding annular water-passage, the contracted tapering ejection-nozzle below the water-passage, and the central nozzle-plug located within the steam-nozzle and also within the ejection-nozzle, substantially as described, whereby the descending column of steam is deflected radially against the surrounding annular column of water, and the steam and water then concentrated into an annular column in their passage through the ejector-nozzle, as set forth.

5. In an injector-condenser, the combination of the central steam-nozzle, the surrounding water-passage, the ejector-nozzle, the central plug within the steam-nozzle and within the ejection-nozzle, and means for longitudinally adjusting said plug, substantially as described, whereby the radial deflection of steam may be varied at the steam-nozzle and the descending column of steam and water more or less annularly concentrated at the ejector-nozzle, as set forth.

6. The injector-condenser, substantially as described, embodying in combination, substantially as described, the steam-nozzle, the ejection-nozzle, the solid central nozzle-plug, and the adjustable annular water-passage.

7. The combination, in an injector-condenser having a water-chamber and steam-nozzle, of the movable inner wall of said water-chamber surrounding said steam-nozzle, the gear-nuts and bolts by which said inner wall is supported, and the internal gear by which said gear-nuts are simultaneously rotated, substantially as described, for adjusting the position of said inner wall with relation to the steam-nozzle, and thereby regulating the water-supply, as set forth.

JEROME WHEELOCK.

Witnesses:
EDW. F. TOLMAN,
HERMAN F. KLINGELE.